US012698194B1

(12) United States Patent
Mindzak

(10) Patent No.: US 12,698,194 B1
(45) Date of Patent: Aug. 4, 2026

(54) FILL-LEVEL INDICATOR FOR LIQUID CONTAINERS

(71) Applicant: Ronald George Mindzak, Mercerville, NJ (US)

(72) Inventor: Ronald George Mindzak, Mercerville, NJ (US)

( * ) Notice: Subject to any disclaimer, the term of this patent is extended or adjusted under 35 U.S.C. 154(b) by 0 days.

(21) Appl. No.: 19/443,446

(22) Filed: Jan. 8, 2026

(51) Int. Cl.
*B67C 3/28* (2006.01)
*B67C 11/00* (2006.01)
*B67C 11/06* (2006.01)
*G01F 23/56* (2006.01)
*G01F 23/64* (2006.01)

(52) U.S. Cl.
CPC ............ *B67C 3/285* (2013.01); *B67C 11/066* (2013.01); *G01F 23/56* (2013.01); *B67C 2011/40* (2013.01); *G01F 23/64* (2013.01)

(58) Field of Classification Search
CPC ......... G01F 23/56; G01F 23/64; G01F 23/30; B67C 2011/40; B67C 3/285; B67C 11/066
USPC ................................. 703/305, 319; 116/228
See application file for complete search history.

(56) References Cited

U.S. PATENT DOCUMENTS

| | | | | | |
|---|---|---|---|---|---|
| 71,378 | A | * | 11/1867 | Gondouin | B67C 11/066 |
| | | | | | 141/200 |
| 579,649 | A | * | 3/1897 | Luckenbach | B67C 11/066 |
| | | | | | 141/202 |

| | | | | | |
|---|---|---|---|---|---|
| 883,289 | A | * | 3/1908 | Burg | B67C 11/04 |
| | | | | | 141/344 |
| 953,065 | A | * | 3/1910 | Smith | B67C 11/063 |
| | | | | | 210/86 |
| 962,674 | A | * | 6/1910 | Sendall | B67C 11/02 |
| | | | | | 116/228 |
| 971,233 | A | * | 9/1910 | Wilson | B67C 11/066 |
| | | | | | 141/200 |
| 994,272 | A | * | 6/1911 | Parker | B67C 11/04 |
| | | | | | 73/294 |
| 1,243,587 | A | * | 10/1917 | Burkett | B67C 11/02 |
| | | | | | 141/95 |
| 1,664,266 | A | * | 3/1928 | Del Rio | B67C 11/063 |
| | | | | | 222/49 |
| 1,836,612 | A | * | 12/1931 | Miller | B67C 11/02 |
| | | | | | 73/294 |
| 2,689,651 | A | * | 9/1954 | Horsdal | B67C 11/02 |
| | | | | | 210/86 |
| 2,895,447 | A | * | 7/1959 | Burrell | G01F 23/58 |
| | | | | | 73/222 |

(Continued)

*Primary Examiner* — Robert F Long
*Assistant Examiner* — Eduardo R Ferrero

(57) ABSTRACT

A removable fill-level indicator device for use with a liquid container is disclosed. The device includes a stop member configured to rest on a portion of an opening of the container and a recessed portion that permits introduction of liquid into the container while the device is in place. A buoyant member is positioned below the stop member and is operatively coupled to the stop member. As liquid is introduced into the container, the buoyant member rises in response to the increasing liquid level and causes upward movement of the stop member to provide a visible indication that a predetermined fill level has been reached. The device is removable, reusable, and does not require modification of the container. The stop member and recessed portion are configured so as not to substantially restrict liquid flow during filling.

4 Claims, 3 Drawing Sheets

Side View of the fill-level device in an actuated position within the container

(56) References Cited

U.S. PATENT DOCUMENTS

| | | | | |
|---|---|---|---|---|
| 2,906,834 | A * | 9/1959 | Dyer | G01F 23/56 |
| | | | | 200/243 |
| 3,296,396 | A * | 1/1967 | Stiward | H01H 35/18 |
| | | | | 200/84 R |
| 3,609,680 | A * | 9/1971 | Belart | B60T 17/225 |
| | | | | 340/450.1 |
| 3,630,083 | A * | 12/1971 | Gorans | G01F 23/58 |
| | | | | 73/322 |
| 3,710,612 | A * | 1/1973 | Innes | G01F 25/22 |
| | | | | 73/1.73 |
| 4,712,595 | A * | 12/1987 | Wilson | B67C 11/063 |
| | | | | 141/DIG. 1 |
| 4,796,470 | A * | 1/1989 | Lahde | G01F 23/30 |
| | | | | 141/94 |
| 4,901,776 | A * | 2/1990 | Attinello | B67C 11/02 |
| | | | | 141/297 |
| 5,630,452 | A * | 5/1997 | Schmid | B67C 11/02 |
| | | | | 141/331 |
| 5,685,352 | A * | 11/1997 | Faught | B67C 11/02 |
| | | | | 141/331 |
| 2005/0236066 | A1 * | 10/2005 | Reinhardt | B67C 11/066 |
| | | | | 141/199 |
| 2016/0377473 | A1 * | 12/2016 | Kienle | B67C 11/066 |
| | | | | 116/201 |
| 2017/0006789 | A1 * | 1/2017 | Santillan | A01G 27/008 |

* cited by examiner

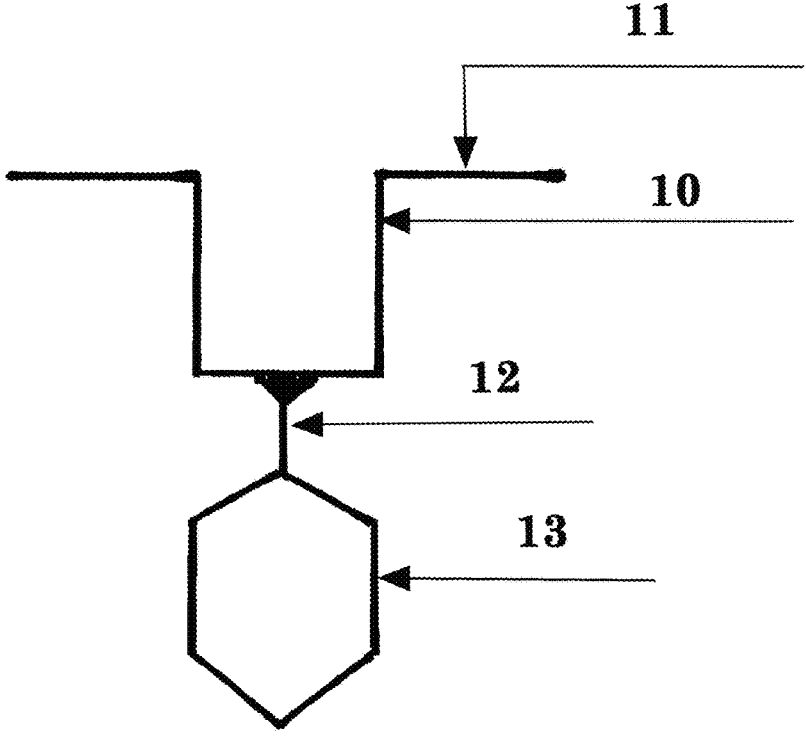
Fig. 1 - Side View of a fill-level indicator device

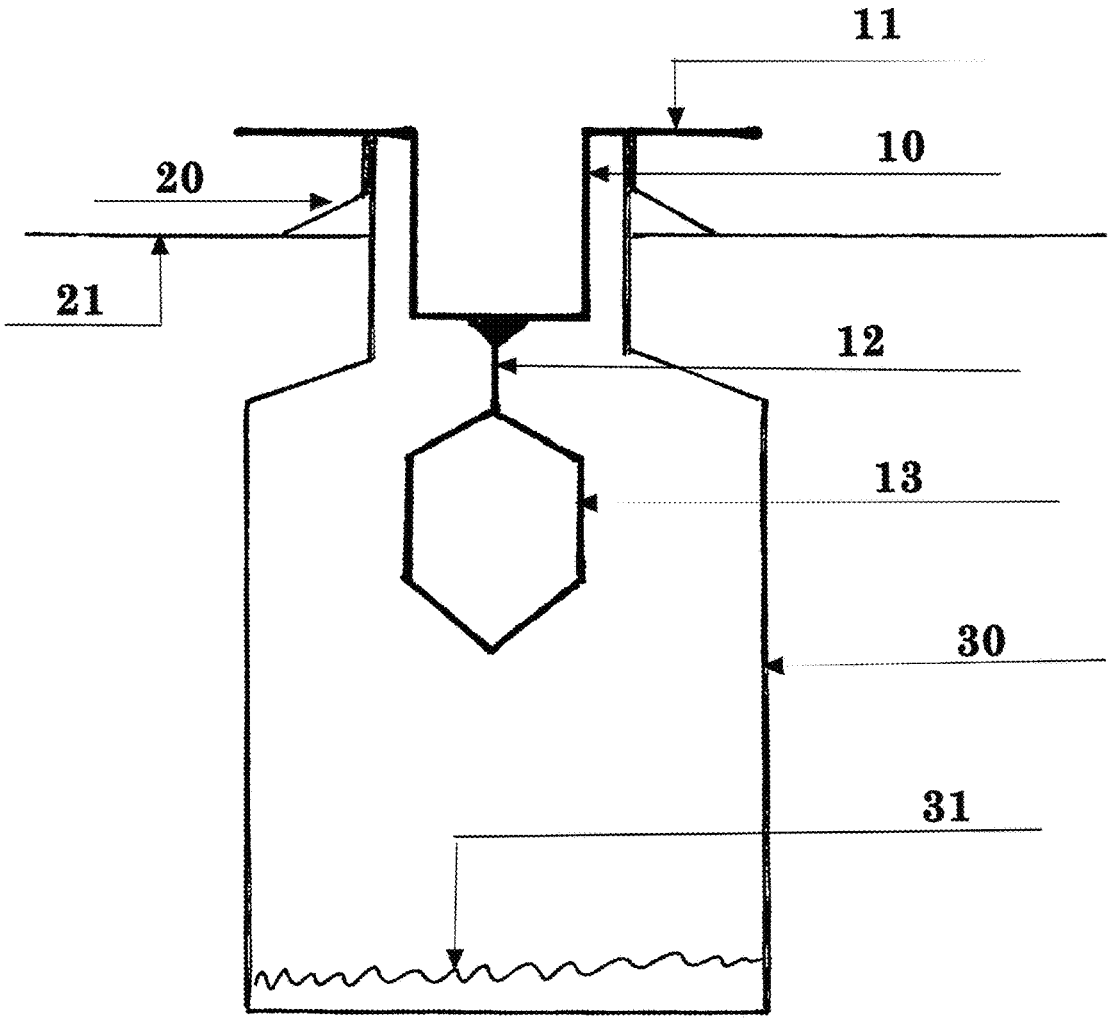
Figure 2 - Side View of the fill-level device positioned within a container

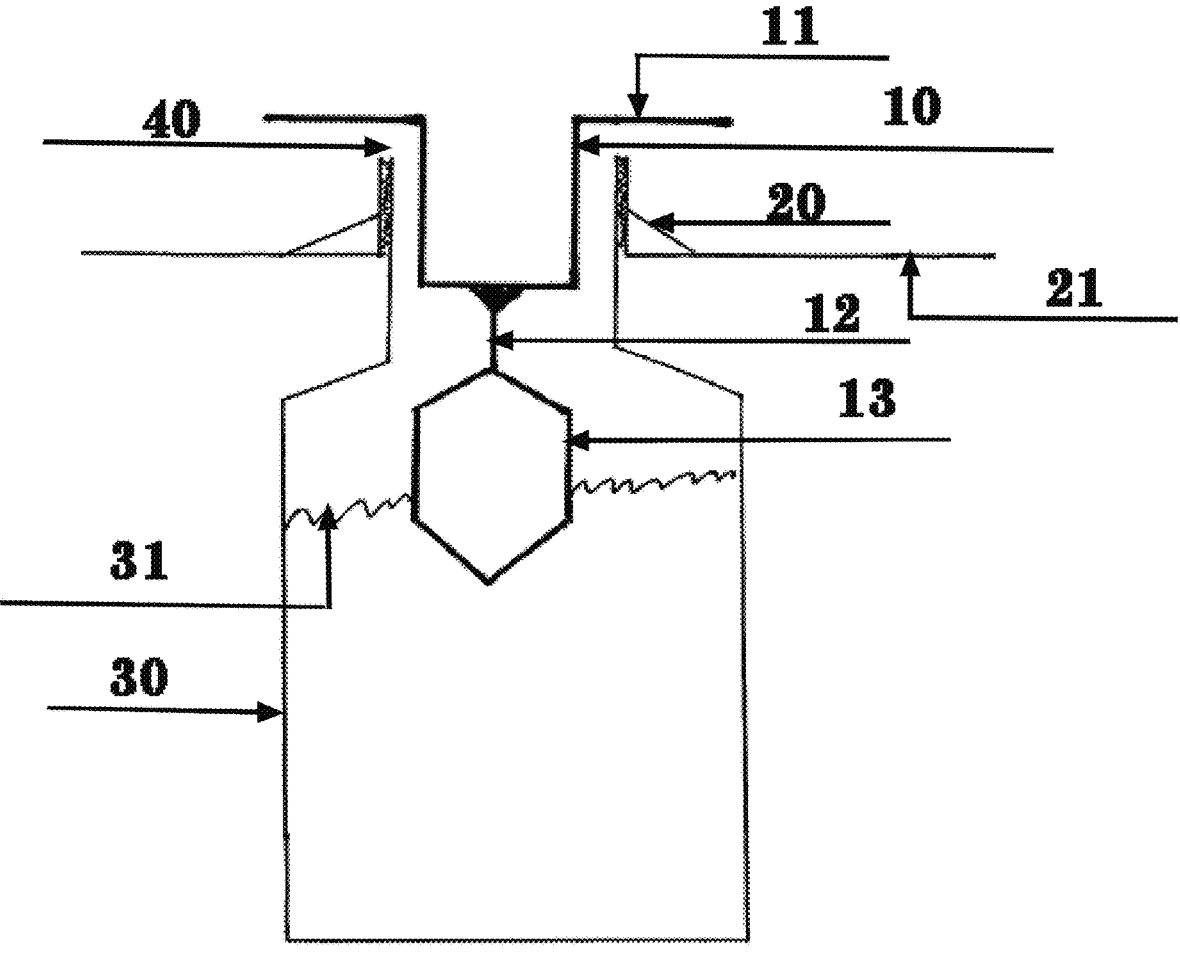
Figure 3 – Side View of the fill-level device in an actuated position within the container

FILL-LEVEL INDICATOR FOR LIQUID CONTAINERS

Specification

BRIEF DESCRIPTION OF THE DRAWINGS

FIG. 1 is a side view of a fill-level indicator device according to one embodiment of the present invention.

FIG. 2 is a side view of the fill-level indicator device positioned within a container.

FIG. 3 is a side view of the fill-level indicator device in an actuated position within the container.

DETAILED DESCRIPTION OF THE INVENTION

Referring now to the drawings, wherein like reference numerals designate corresponding parts throughout the several views, a fill-level indicator device according to one embodiment of the present invention is illustrated.

As shown in FIG. 1, the fill-level indicator device comprises a stop member 11, a recessed portion 10, an elongated connecting member 12, and a buoyant member 13.

The stop member 11 is configured to rest on or engage an upper portion of a container opening. In the illustrated embodiment, the stop member extends laterally across a portion of the opening while leaving a substantial open region through which liquid may be introduced into the container. The stop member does not fully span the container opening and is dimensioned so as not to obstruct or restrict fluid flow during refilling.

The recessed portion 10 extends downward from the stop member and is configured to receive or accommodate a pouring aid, such as a funnel, spout, or directed liquid stream. The recessed portion provides clearance that allows liquid to be introduced into the container while the fill-level indicator device remains positioned in place. The recessed portion, in combination with the stop member, is dimensioned to permit unrestricted fluid flow into the container during refilling operations.

The elongated connecting member 12 extends downward from the recessed portion toward the interior of the container. The elongated connecting member mechanically connects the stop member to the buoyant member and transmits vertical movement of the buoyant member to the stop member. In one embodiment, the elongated connecting member is configured with sufficient rigidity to transmit motion while optionally providing limited flexibility to accommodate insertion, removal, or variations in container geometry. The elongated connecting member is dimensioned so as not to interfere with fluid flow into the container.

The buoyant member 13 is attached to a lower end of the elongated connecting member and is configured to float within a liquid contained in the container. The buoyant member may be hollow, solid, or otherwise configured to provide buoyancy in common household liquids such as soaps, detergents, or similar fluids. As the liquid level rises within the container, the buoyant member rises correspondingly.

As shown in FIG. 2, the fill-level indicator device is positioned within a container 30, which may be supported by a container support structure 20 adjacent a support surface 21, such as a sink top or countertop. When the container is empty or partially filled, the buoyant member remains below the liquid surface, and the stop member remains seated on the container opening.

As shown in FIG. 3, when the liquid level 31 rises to a predetermined height, the buoyant member rises and causes upward movement of the elongated connecting member and stop member. This upward movement creates a visible and tactile clearance space 40 between the stop member and the container opening, indicating that the container has reached a desired fill level. The clearance space provides a clear signal to the user to stop adding liquid, thereby preventing overfilling and spillage.

The fill-level indicator device is removable and reusable and does not require permanent modification of the container. The stop member, recessed portion, elongated connecting member, and buoyant member may be formed as a single integral component or as multiple joined components. The device may be manufactured from polymeric materials, including polypropylene or similar materials, although other materials may be used without departing from the scope of the invention.

Dimensions, shapes, proportions, and relative sizes of the components shown in the drawings are exemplary only. Variations in geometry, length, thickness, and configuration may be employed to accommodate containers of differing sizes and shapes while maintaining the functional principles described herein.

REFERENCE NUMERALS USED IN THE DRAWINGS

10—recessed portion of the fill-level indicator device configured to receive a container opening 11—stop member configured to rest on an upper edge of a container opening 12—elongated connecting member extending downward from the stop member 13—buoyant member configured to rise in response to a liquid level 20—container support structure 21—support surface adjacent the container opening 30—liquid container 31—liquid level within the container 40—clearance space indicating actuation of the fill-level indicator device

The invention claimed is:

1. A removable fill-level indicator device for a liquid container, comprising:

a stop member configured to rest on a rim of an opening of the container, a buoyant member positioned below the stop member and operatively coupled to the stop member; and a recessed portion associated with the stop member, the recessed portion being configured to permit introduction of liquid into the container through the opening; and wherein the recessed portion comprises a plurality of elements extending downwards from the stop member and laterally towards each other, the plurality of elements operatively coupled to the buoyant member, wherein the buoyant member is configured to rise in response to a rising liquid level within the container and cause an upward movement of the stop member to provide a visible indication that the liquid has reached a predetermined fill level, and wherein the stop member and recessed portion are dimensioned to permit liquid to flow into the container during a filling operation, wherein the recessed portion extends downward from the stop member and is configured to receive a pouring aid, wherein the recessed portion provides clearance that allows liquid to be introduced into the container while the fill-level indicator device remains positioned in place, wherein the recessed portion, in combination with the stop member and the buoyant member, is dimensioned to permit fluid flow into the container during the filling operation, and wherein the upward movement of the stop member causes at least a portion of the stop member to rise above the rim of the container opening.

2. The device of claim 1, further comprising an elongated member extending between the stop member and the buoyant member.

3. The device of claim 1, wherein the stop member, recessed portion, and buoyant member are formed as a single integral component.

4. The device of claim 1, wherein the recessed portion is configured to receive a funnel during filling.

*   *   *   *   *